(No Model.)

C. F. SCOTT.
LAMINATED CONVERTER CORE.

No. 509,770. Patented Nov. 28, 1893.

WITNESSES:
James Wm. Smith
H. C. Tener

INVENTOR
C. F. Scott
BY
Terry and MacKaye
ATTORNEYS

UNITED STATES PATENT OFFICE.

CHARLES F. SCOTT, OF PITTSBURG, PENNSYLVANIA.

LAMINATED CONVERTER-CORE.

SPECIFICATION forming part of Letters Patent No. 509,770, dated November 28, 1893.

Application filed November 25, 1892. Serial No. 453,140. (No model.)

*To all whom it may concern:*

Be it known that I, CHARLES F. SCOTT, a citizen of the United States, residing in the city of Pittsburg, in the county of Allegheny, State of Pennsylvania, have invented a new and useful Improvement in Laminated Converter-Cores, (Case No. 518,) of which the following is a specification.

My invention relates to converters for alternating electric currents and methods for making the same.

One object of my invention is the provision of a method of stamping the plates whereof electric converters are composed such that there shall be no iron wasted in stamping from a large sheet but all shall be consumed in the plates as made.

Another object of my invention is the provision of a converter composed of plates built with maximum stability and with the least expense of time consumed in the adjustment of the coils to the core.

The nature of my invention is fully disclosed in the accompanying drawings, in which—

Figure 1:
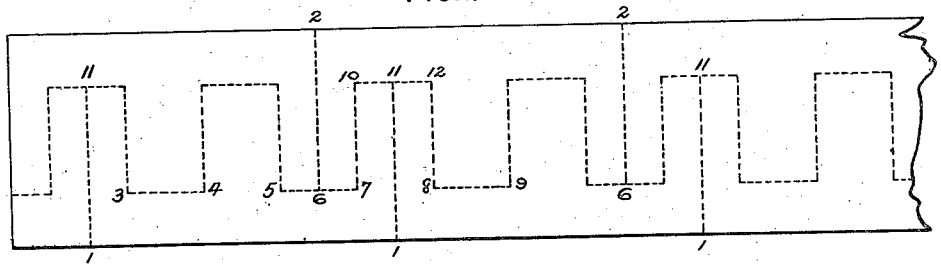
Figure 2:
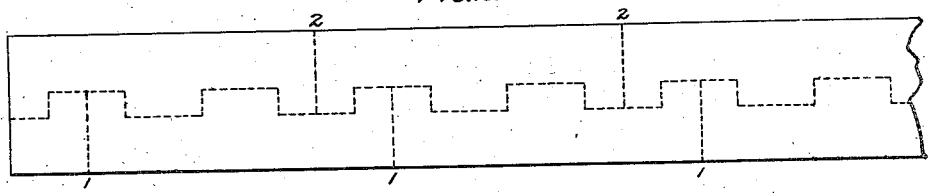
Figure 3:
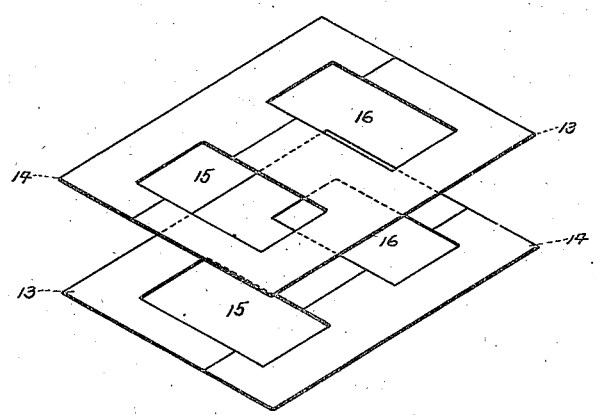

Figure 1 is a view of the wide plate used as a blank, showing in dots the lines along which the blank is stamped. Fig. 2 is a similar view of the narrow blank, and Fig. 3 shows in perspective the manner in which broad and narrow plates are laid together with relation to the coils to form my converter.

The broad plate shown in Fig. 1 is first stamped progressively or otherwise divided along the dotted lines shown. The strips thus cut out are similar in outline and are provided with teeth of uniform depth and width. The toothed strips thus produced are then divided along the lines 1, 11 and 2, 6, through the middle of alternate teeth in each strip. The distance 5, 6 is thus one-half of 5, 7, and the distance 10, 11, is one-half of 10, 12. The E-shaped plates 13, are thus produced, having the end projections one-half as wide as the middle ones. The narrow strip shown in Fig. 2 having been treated in the same manner as the broad strip, E-shaped plates 14 are produced, which when brought against the plates 13, as shown in Fig. 3, produce a closed magnetic circuit of two branches around the converter coils in the openings 15 and 16.

The object of using toothed plates of different widths is to permit of their breaking joints in being assembled in the completed core. The mode of bringing successive elements of the converter together is plainly shown in Fig. 3, where it will be seen that alternate laminae have the positions of the broad and narrow plates reversed. The result is that successive points of junction between plates are not superimposed and the solidity of the whole structure is insured.

A further advantage from breaking joints in successive plates lies in the better magnetic circuit thus produced. If the E-plates were all of the same width, and all met in a single plane in the middle of the converter, all the lines of force would necessarily have to pass across the high-resistance joint between the plates. Where the joints are broken, however, when lines of force reach a joint in a given plate they are free to take a side course through the integral plates above and below the joint. Thus the total magnetic resistance is greatly decreased at the joint.

What I claim is—

1. The method of forming plates for building laminated cores which consists in dividing a rectangular strip along a continuous rectangularly broken line so as to form two strips having teeth of uniform width and then dividing each toothed strip through the middle of alternate teeth, substantially as described.

2. The method of forming two elements of laminated cores which consists in dividing a broad and a narrow rectangular strip along continuous rectangularly broken lines, so as to form four strips having teeth of equal and uniform width, dividing each strip through the middle of alternate teeth, and setting a narrow toothed plate opposite each broad one with the outer edges of their teeth juxtaposed.

3. A laminated converter core consisting of successive elements each of which is composed of a broad E-shaped plate and a narrow one set edge-wise together, said elements being piled up with joints between the E-plates on alternately opposite sides of the median plane of said core, substantially as described.

In testimony whereof I have hereunto subscribed my name this 14th day of November, A. D. 1892.

CHAS. F. SCOTT.

Witnesses:
JAMES WM. SMITH,
HAROLD S. MACKAYE.